United States Patent
Goto et al.

(10) Patent No.: US 7,346,247 B2
(45) Date of Patent: Mar. 18, 2008

(54) WAVELENGTH-VARIABLE SHORT PULSE GENERATING DEVICE AND METHOD

(75) Inventors: Toshio Goto, Aichi (JP); Norihiko Nishizawa, Aichi (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 252 days.

(21) Appl. No.: 10/523,080

(22) PCT Filed: Jul. 22, 2003

(86) PCT No.: PCT/JP03/09241

§ 371 (c)(1),
(2), (4) Date: Jul. 29, 2005

(87) PCT Pub. No.: WO2004/012003

PCT Pub. Date: Feb. 5, 2004

(65) Prior Publication Data

US 2006/0051037 A1    Mar. 9, 2006

(30) Foreign Application Priority Data

Jul. 29, 2002   (JP)   ............................. 2002-219278

(51) Int. Cl.
*G02B 6/00* (2006.01)

(52) U.S. Cl. ........................................ 385/122; 385/27

(58) Field of Classification Search .................... None
See application file for complete search history.

(56) References Cited

U.S. PATENT DOCUMENTS

| 6,014,249 A * | 1/2000 | Fermann et al. ......... 359/341.1 |
| 6,618,531 B1 * | 9/2003 | Goto et al. ................. 385/122 |
| 6,813,429 B2 * | 11/2004 | Price et al. ................. 385/125 |
| 6,906,283 B2 * | 6/2005 | Arisawa et al. ......... 219/121.85 |

FOREIGN PATENT DOCUMENTS

EP    1118904    7/2001

OTHER PUBLICATIONS

Ito, Y. et al., Third harmonic generation of wavelength tunable soliton oulse in optical fiber, Extended Abstracts (the 63$^{rd}$ Autumn Meeting, 2002); The Japan society of Applied Physics, No. 3, p. 948.

* cited by examiner

*Primary Examiner*—Tina M. Wong
(74) *Attorney, Agent, or Firm*—Oblon, Spivak, McClelland, Maier & Neustadt, P.C.

(57) ABSTRACT

An apparatus and method for generating a wavelength-tunable short pulse that can generate wavelength-tunable short pulsed light in the visible-light wavelength band are provided. When ultrashort pulsed light is introduced into an optical fiber (3), a wavelength-tunable ultrashort soliton pulse is generated by a nonlinear optical effect through the soliton effect and Raman scattering. When the soliton pulse has a short duration and high peak intensity, a third harmonic having one-third of the wavelength of the soliton pulsed light is generated by a third nonlinear optical effect. This third harmonic has a short wavelength in the visible light band.

10 Claims, 4 Drawing Sheets

FIG. 8
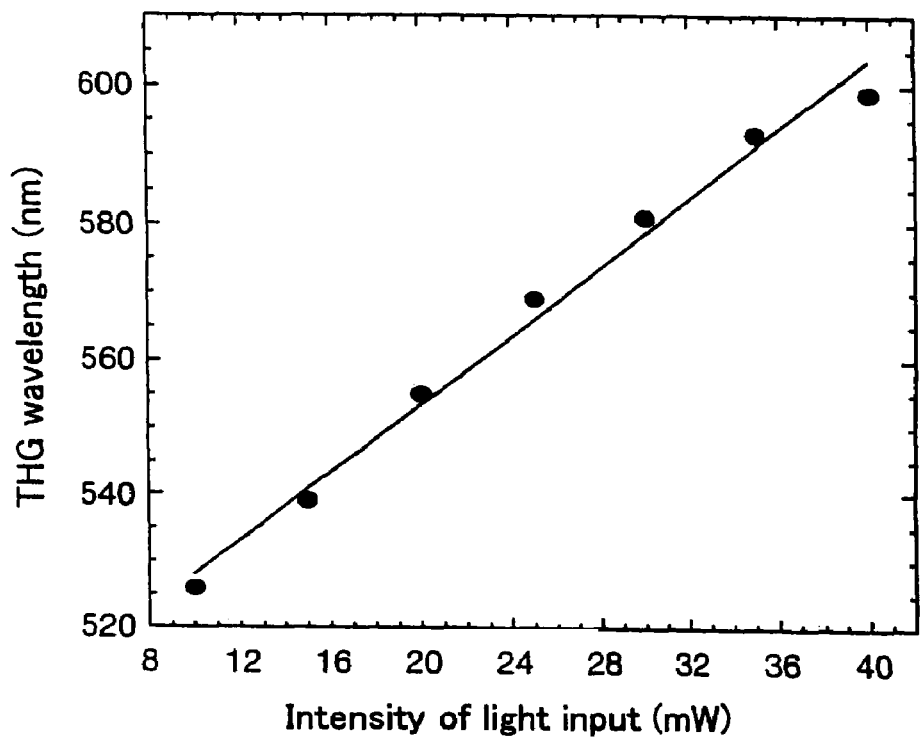
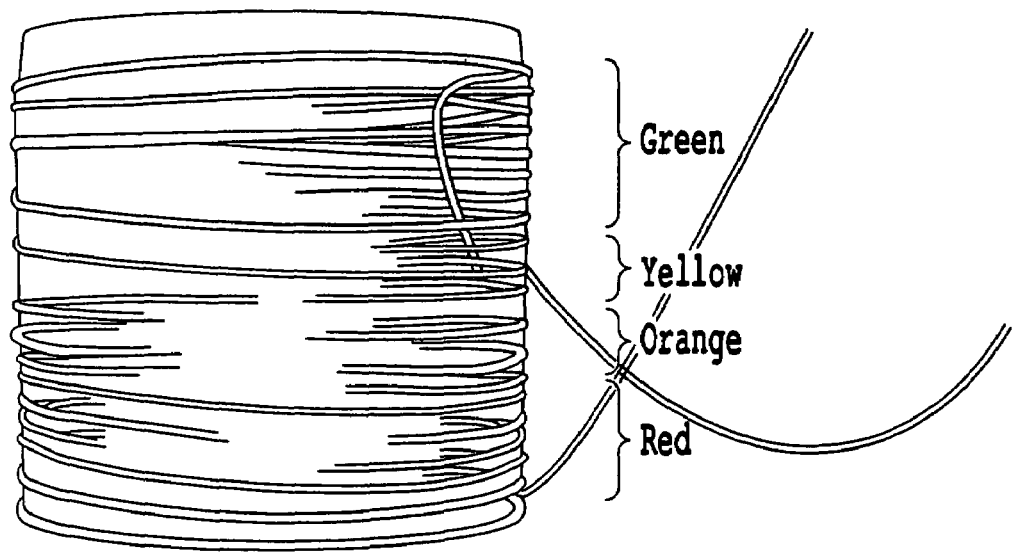
FIG. 9

WAVELENGTH-VARIABLE SHORT PULSE GENERATING DEVICE AND METHOD

TECHNICAL FIELD

The present invention relates to an apparatus and a method for generating a wavelength-tunable short pulse. More particularly, the present invention relates to a technique to generate wavelength-tunable short pulsed light by a nonlinear optical effect in an optical fiber and the third harmonic of the generated wavelength-tunable short pulsed light, thereby obtaining wavelength-tunable short pulsed light in a short-wavelength band. The apparatus and method of the present invention find particular application in optoelectronics, optical measurement, and measurement of spectra and biological material.

BACKGROUND ART

The present inventors have developed a technique to generate wavelength-tunable short pulsed light through a combination of an optical fiber and an ultrashort optical-pulse source (see Japanese Unexamined Patent Application Publication No. 2000-105394).

DISCLOSURE OF INVENTION

With the aforementioned technique, however, pulsed light with a short wavelength in the visible-light wavelength band cannot be generated.

It is an object of the present invention to provide an apparatus and method for generating a wavelength-tunable short pulse that can generate wavelength-tunable short pulsed light in the visible-light wavelength band.

To achieve the aforementioned object, the present invention provides the following:

(1) An apparatus for generating a wavelength-tunable short pulse includes: an ultra-short optical pulse source; an optical-property regulator for regulating the properties of an output from the ultra-short optical pulse source; and an optical fiber for receiving the output from the optical-property regulator, the optical fiber generating wavelength-tunable ultrashort pulsed light by a nonlinear optical effect through the soliton effect and Raman scattering and generating a third harmonic of the wavelength-tunable ultrashort pulsed light by a third-order nonlinear optical effect.

(2) In the apparatus for generating a wavelength-tunable short pulse as set forth in (1), the optical-property regulator is a light-intensity regulator.

(3) In the apparatus for generating a wavelength-tunable short pulse as set forth in (1) or (2), the wavelength of the pulsed light is altered by changing the intensity of light input to the optical fiber by the light-intensity regulator, thereby controlling the wavelength of the third harmonic.

(4) In the apparatus for generating a wavelength-tunable short pulse as set forth in (1), (2), or (3), the wavelength of the pulsed light is altered by changing the length of the optical fiber, thereby controlling the wavelength of the third harmonic.

(5) A method for generating a wavelength-tunable short pulse includes the steps of: receiving an output from an ultra-short optical pulse source at an optical fiber, the output having passed through an optical-property regulator; generating wavelength-tunable ultrashort pulsed light by a nonlinear optical effect through the soliton effect and Raman scattering in the optical fiber; and generating a third harmonic of the wavelength-tunable ultrashort pulsed light by a third-order nonlinear optical effect in the optical fiber.

(6) In the method for generating a wavelength-tunable short pulse as set forth in (5), the optical-property regulator is a light-intensity regulator.

(7) In the method for generating a wavelength-tunable short pulse as set forth in (5) or (6), the wavelength of the pulsed light is altered by changing the intensity of light input to the optical fiber by the light-intensity regulator, thereby controlling the wavelength of the third harmonic.

(8) In the method for generating a wavelength-tunable short pulse as set forth in (5), (6), or (7), the wavelength of the pulsed light is altered by changing the length of the optical fiber, thereby controlling the wavelength of the third harmonic.

BRIEF DESCRIPTION OF THE DRAWINGS

FIG. 8 is a graph showing dependency of the wavelength of the third harmonic pulse generated in the example of the present invention upon the intensity of light input to the optical fiber.

FIG. 9 shows a photograph (substituted for drawing) of the third harmonic scattered off the surface of the optical fiber of the example according to the present invention.

BEST MODE FOR CARRYING OUT THE INVENTION

Embodiments of the present invention will now be described in detail.

Figure 1:
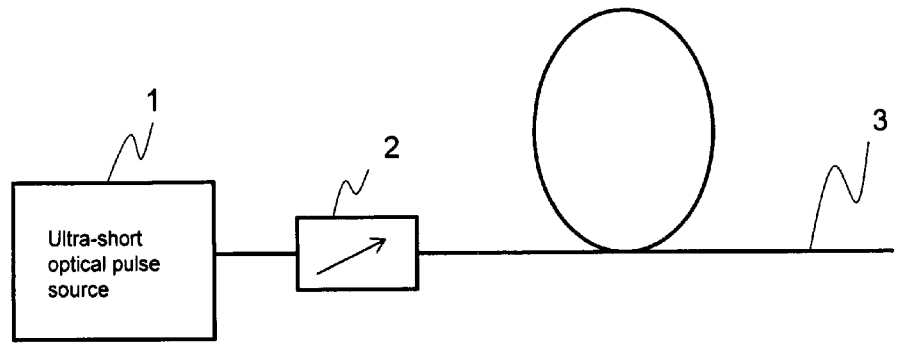
FIG. 1 is a conceptual view of an apparatus for generating a wavelength-tunable short pulse according to the present invention.

FIG. 1 is a conceptual view of an apparatus for generating a wavelength-tunable short pulse according to the present invention.

In FIG. 1, 1 denotes an ultra-short optical pulse source, 2 denotes a light-intensity regulator, which is connected to the ultra-short optical pulse source 1, and 3 denotes an optical fiber, which is connected to the light-intensity regulator 2.

When an output from the ultra-short optical pulse source 1 is input to the optical fiber 3 through the light-intensity regulator 2, wavelength-tunable ultrashort pulsed light is generated by the nonlinear optical effects in the optical fiber 3, that is, the soliton effect and Raman scattering effect, and, in turn, the third harmonic of the wavelength-tunable ultrashort pulsed light is generated by the third-order nonlinear optical effect in the optical fiber 3.

The wavelength of the wavelength-tunable ultrashort pulsed light can be altered by changing the intensity of the light entering the optical fiber 3 by the light-intensity regulator 2, which, in turn, controls the wavelength of the third harmonic.

Alternatively, the wavelength of the wavelength-tunable ultrashort pulsed light can be altered by changing the length of the optical fiber 3 to control the wavelength of the third harmonic.

Now, generation of the third harmonic will be described in detail. As described above, input of the ultrashort pulsed light to the optical fiber 3 generates a wavelength-tunable ultrashort soliton pulse by the soliton effect and Raman scattering. When the wavelength-tunable ultrashort soliton pulse has short duration and high peak intensity, the third harmonic with one-third of the wavelength of the pulsed light is generated by the third-order nonlinear effect. This third harmonic has a short wavelength in the visible light band.

Figure 2:
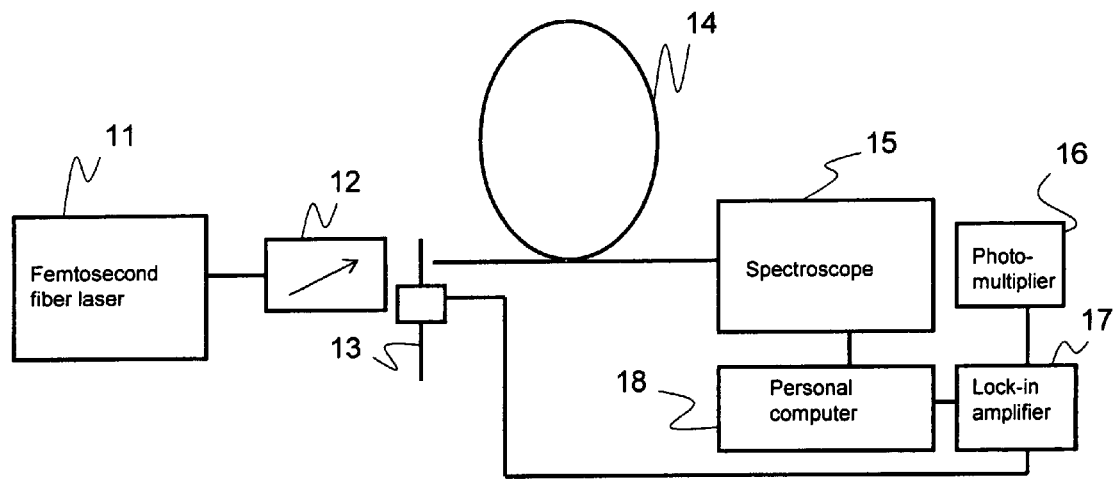
FIG. 2 is a block diagram of an apparatus for generating a wavelength-tunable ultrashort pulse according to a first embodiment of the present invention.

FIG. 2 is a block diagram of an apparatus for generating a wavelength-tunable ultrashort pulse according to a first embodiment of the present invention.

In FIG. 2, 11 denotes a femtosecond fiber laser serving as the ultrashort optical pulse source, 12 denotes a light-intensity regulator, which is connected to the femtosecond fiber laser 11, 13 denotes a light chopper, which is connected to the light-intensity regulator 12, 14 denotes a polarization maintaining fiber, which is connected to the light chopper 13, 15 denotes a spectroscope, which is connected to the polarization maintaining fiber 14, 16 denotes a photomultiplier, which is connected to the spectroscope 15, 17 denotes a lock-in amplifier 17, which is connected to the light chopper 13 and the photomultiplier 16, and 18 denotes a personal computer (PC), which is connected to the spectroscope 15 and the lock-in amplifier 17.

The femtosecond fiber laser (ultrashort optical pulse source) 11 constitutes a pump light source, and the light-intensity regulator 12 is composed of a waveplate and an optical splitting unit for splitting polarized light. The thin polarization maintaining fiber 14 has a core diameter of 6 μm.

An output from the light-intensity regulator 12 passes through the light chopper 13 to propagate through the polarization maintaining fiber 14. The output from the polarization maintaining fiber 14 passes through the spectroscope 15 to be detected by the photomultiplier 16. Then, the output from the photomultiplier 16 is amplified through the lock-in amplifier 17. A signal from the light chopper 13 is input to the lock-in amplifier 17. The lock-in amplifier 17 and the spectroscope 15 are connected to the PC 18 and thus function as an automatic measuring system.

Figure 3:
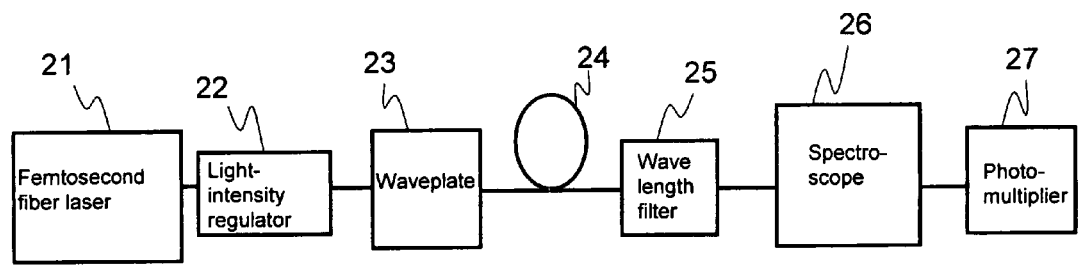
FIG. 3 is a block diagram of an apparatus for generating a wavelength-tunable ultrashort pulse according to a second embodiment of the present invention.

FIG. 3 is a block diagram of an apparatus for generating a wavelength-tunable ultrashort pulse according to a second embodiment of the present invention.

In FIG. 3, 21 denotes a femtosecond fiber laser serving as an ultrashort optical pulse source, 22 denotes a light-intensity regulator, which is connected to the femtosecond fiber laser 21, 23 denotes a waveplate, which is connected to the light-intensity regulator 22, 24 denotes an optical fiber, which is connected to the waveplate 23 and has a short length and a small diameter, 25 denotes a wavelength filter, 26 denotes a spectroscope, and 27 denotes a photomultiplier.

The second embodiment accomplishes the following:

1. Since the waveplate 23 is disposed close to the end of the optical fiber 24 from which light enters, the direction of the polarized light is adjusted; that is, the polarized light becomes parallel to the axis of birefringence.

2. Since a polarization maintaining fiber constitutes the optical fiber, the light is kept linearly polarized while propagating through the optical fiber.

Furthermore, since the optical fiber 24 has a short length (10 m or less) and a small diameter (6 μm or less), anomalous dispersion occurs therein. Accordingly, the pulse is compressed in the optical fiber 24, which, in turn, increases the peak light intensity.

A combination of 1 and 2 achieves the third-order nonlinear effect.

Furthermore, since the wavelength filter 25 is disposed close to the other end of the optical fiber 24 from which light is emitted, only the third harmonic passes through the wavelength filter 25.

Figure 4:
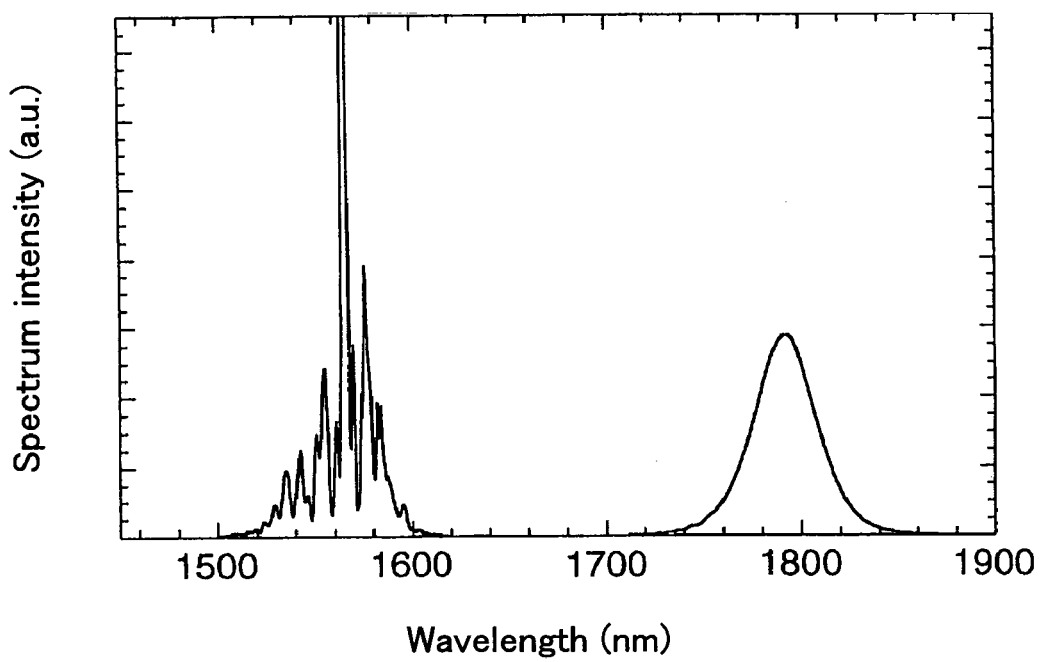
FIG. 4 shows a soliton spectrum according to an example of the present invention.

FIG. 4 shows a soliton spectrum according to an example of the present invention. In the spectrum, the abscissa represents wavelengths (nm), whereas the ordinate represents spectrum intensity (arbitrary unit).

FIG. 4 shows a spectrum of pump light and wavelength-tunable soliton pulses obtained from outputs using a 5-m optical fiber. A $Sech^2$-shape wavelength-tunable soliton pulse was generated on the longer wavelength side of the pump light. The intensity of the light input to the fiber was 40 mW.

Figure 5:
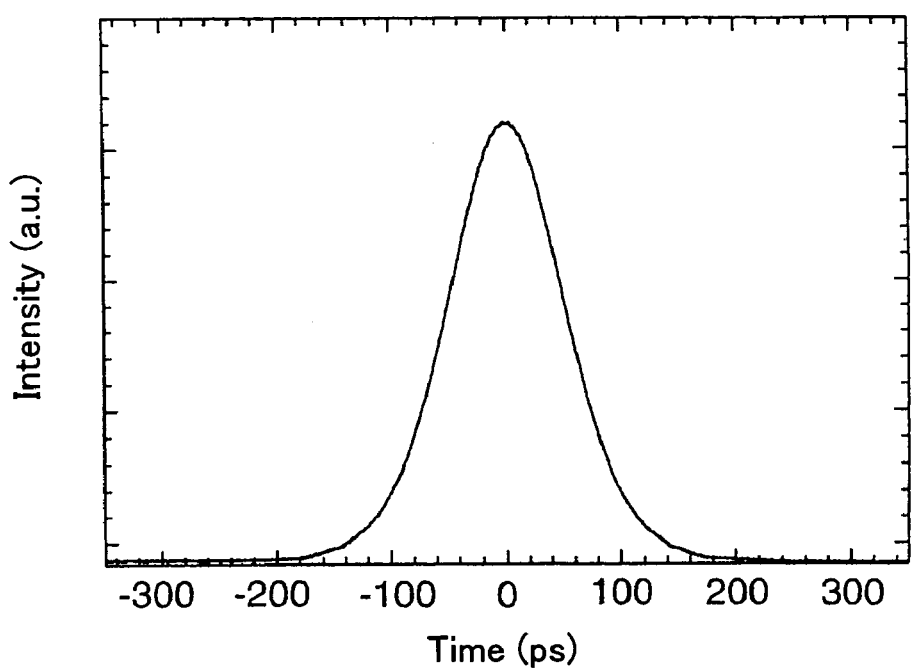
FIG. 5 shows a waveform of an autocorrelation function for a wavelength-tunable soliton pulse generated in the apparatus according to the example of the present invention.

FIG. 5 shows a waveform of an autocorrelation function for the wavelength-tunable soliton pulse according to the example of the present invention. In the graph, the abscissa represents time (ps), whereas the ordinate represents intensity (arbitrary unit).

There were no pedestal components and a neat waveform corresponding to the $Sech^2$ pulse shape was observed. The duration for the waveform was 74 fs.

Figure 6:
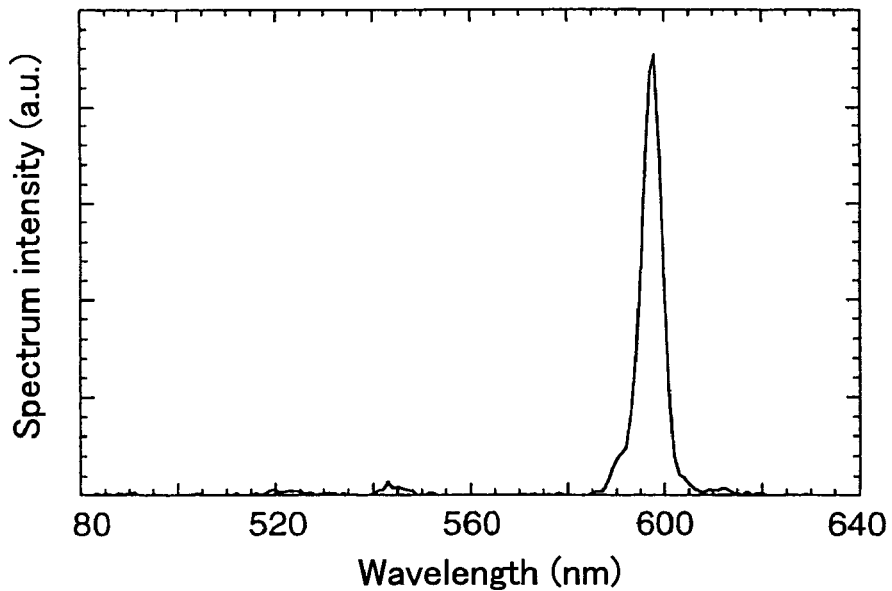
FIG. 6 shows a spectrum of the third harmonic generated in the apparatus according to the example of the present invention.

FIG. 6 shows a spectrum of the third harmonic generated in the example of the present invention. The abscissa represents wavelengths (nm), whereas the ordinate represents spectrum intensity (arbitrary unit).

As shown in FIG. 6, a pulse spectrum was generated at one-third of the wavelength of the soliton pulse shown in FIG. 4.

Figure 7:
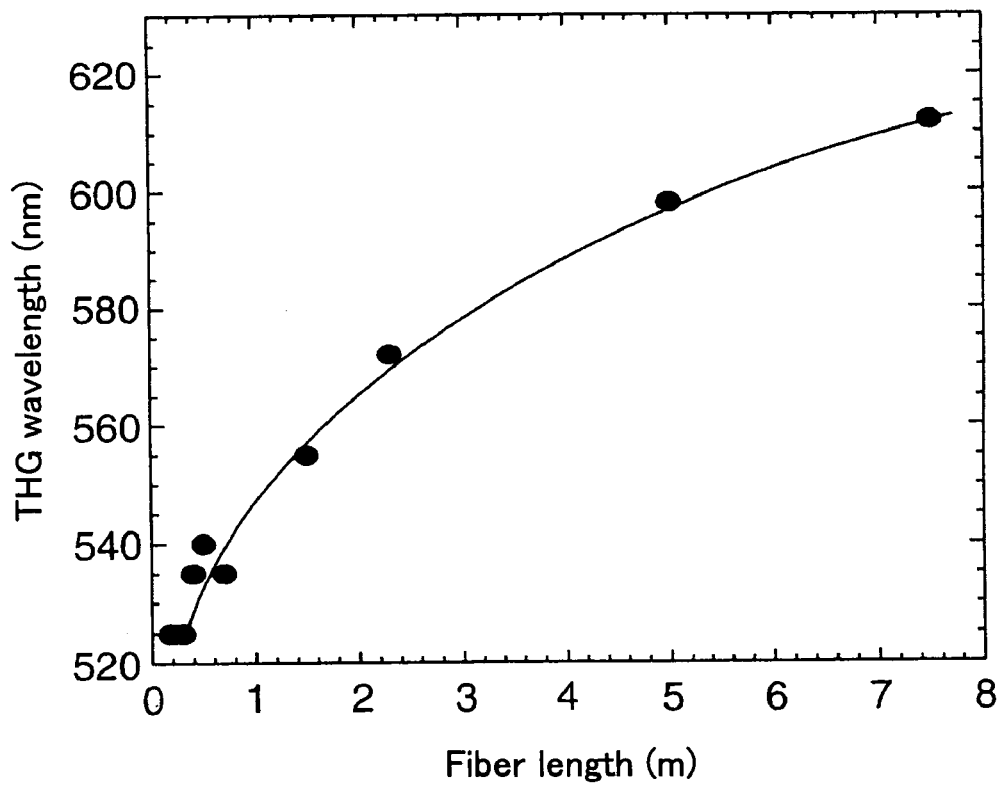
FIG. 7 is a graph showing dependency of the shift in the wavelength of the third harmonic pulse generated in the example of the present invention upon the length of the optical fiber.

FIG. 7 is a graph showing dependency of the shift in the wavelength of the third harmonic pulse generated in the example of the present invention upon the length of the optical fiber. In the graph, the abscissa represents lengths of the optical fiber (m), whereas the ordinate represents the wavelength of the third harmonic (nm) generated by third harmonic generation (THG).

As apparent from FIG. 7, as the length of the optical fiber increased, the wavelength of the wavelength-tunable soliton pulse shifted towards the longer wavelength side in accordance with the shift of soliton self-frequency. Consequently, the wavelength of the generated third harmonic pulse shifted towards the longer wavelength side. The wavelength of the third harmonic pulse was one-third of the wavelength of the wavelength-tunable soliton pulse.

FIG. 8 is a graph showing dependency of the wavelength of the third harmonic pulse generated in the example of the present invention upon the intensity of light input to the optical fiber. In FIG. 8, the abscissa represents the intensity of light input to the optical fiber (mW), whereas the ordinate represents the wavelength of the third harmonic pulse (nm) generated through THG.

As apparent from FIG. 8, as the intensity of light input to the optical fiber increased, the wavelength of the wavelength-tunable soliton pulse linearly shifted towards the longer wavelength side. Accordingly, the wavelength of the generated third harmonic linearly shifted towards the longer wavelength side.

FIG. 9 shows a photograph (substituted for drawing) of the third harmonic scattered off the surface of the optical fiber of the example according to the present invention.

As shown in the drawing, as the pulsed light propagated through the optical fiber, the wavelength of the soliton pulse monotonically shifted toward the longer wavelength side. Consequently, the generated third harmonic shifted in the order of green, yellow, orange, and red. By observing the wavelength or color of the third harmonic, the shift in the wavelength of the pulsed light propagating through the optical fiber could be determined.

With the above-described structure, a third harmonic with color that is intense enough to be perceived is generated so that the change in wavelength in accordance with the propagation of the pulsed light through the optical fiber can be visually observed. Alternatively, the change in wavelength can be observed by setting a frequency meter in the optical fiber.

The aforementioned generation of the colored third harmonic suggests that, in the future, three primary colors can be output with a single optical fiber, which offers great advantages.

In the above-embodiment, the light source and the light-intensity regulator are illustrated in different blocks. Alternatively, a unit having functions of the light source and the light-intensity regulator may constitute a single block.

The present invention is not limited to the above embodiments but may rather be modified within the scope of the present invention. The present invention encompasses these modifications.

As has been described above, the present invention achieves the following advantages.

(A) Wavelength-tunable short pulsed light can be generated, the light continuously shifting in the visible wavelength band relative to the intensity of light input to the optical fiber.

(B) A third-harmonic pulse can be generated simply by inputting pulsed light to the optical fiber.

(C) The shift of the wavelength-tunable soliton pulse in accordance with the propagation of the light through the optical fiber is readily observed.

INDUSTRIAL APPLICABILITY

The apparatus and method for generating a wavelength-tunable short pulse of the present invention are particularly suitable for optoelectronics, optical measurement, and measurement of spectra and biological material.

The invention claimed is:

1. An apparatus for generating a wavelength-tunable short pulse, comprising:
   (a) an ultra-short optical pulse source;
   (b) an optical-property regulator for regulating the properties of an output from the ultra-short optical pulse source; and
   (c) an optical fiber for receiving the output from the optical-property regulator, the optical fiber generating wavelength-tunable ultrashort pulsed light by a nonlinear optical effect through the soliton effect and Raman scattering and generating a third harmonic of the wavelength-tunable ultrashort pulsed light by a third-order nonlinear optical effect.

2. The apparatus for generating a wavelength-tunable short pulse according to claim 1, wherein the optical-property regulator is a light-intensity regulator.

3. The apparatus for generating a wavelength-tunable short pulse according to claim 1 or claim 2, wherein the wavelength of the pulsed light is altered by changing the intensity of light input to the optical fiber by the light-intensity regulator, thereby controlling the wavelength of the third harmonic.

4. The apparatus for generating a wavelength-tunable short pulse according to claim 3, wherein the wavelength of the pulsed light is altered by changing the length of the optical fiber, thereby controlling the wavelength of the third harmonic.

5. The apparatus for generating a wavelength-tunable short pulse according to claim 1 or claim 2, wherein the wavelength of the pulsed light is altered by changing the length of the optical fiber, thereby controlling the wavelength of the third harmonic.

6. A method for generating a wavelength-tunable short pulse, comprising the steps of:
   (a) receiving an output from an ultra-short optical pulse source at an optical fiber, the output having passed through an optical-property regulator;
   (b) generating wavelength-tunable ultrashort pulsed light by a nonlinear optical effect through the soliton effect and Raman scattering in the optical fiber; and
   (c) generating a third harmonic of the wavelength-tunable ultrashort pulsed light by a third-order nonlinear optical effect in the optical fiber.

7. The method for generating a wavelength-tunable short pulse according to claim 6, wherein the optical-property regulator is a light-intensity regulator.

8. The method for generating a wavelength-tunable short pulse according to claim 6 or claim 7, wherein the wavelength of the pulsed light is altered by changing the intensity of light input to the optical fiber by the light-intensity regulator, thereby controlling the wavelength of the third harmonic.

9. The method for generating a wavelength-tunable short pulse according to claim 8, wherein the wavelength of the pulsed light is altered by changing the length of the optical fiber, thereby controlling the wavelength of the third harmonic.

10. The method for generating a wavelength-tunable short pulse according to claim 6 or claim 7, wherein the wavelength of the pulsed light is altered by changing the length of the optical fiber, thereby controlling the wavelength of the third harmonic.

* * * * *